United States Patent

Sakka et al.

[15] 3,675,111

[45] July 4, 1972

[54] AUTOMATIC DC VOLTAGE REGULATING SYSTEM

[72] Inventors: Toshikatsu Sakka, 8-12, 4-chome, Higashi-Mukojima, Sumida-ku, Tokyo; Kiyoshi Takano, 1814 Mutsuura-cho, Kanazawa-ku, Yokohama-shi, Kanagawa, both of Japan

[22] Filed: June 11, 1971

[21] Appl. No.: 152,049

[30] Foreign Application Priority Data

June 25, 1970 Japan...................................45/55721

[52] U.S. Cl............................321/18, 307/252 P, 307/297, 323/22 SC, 323/35, 323/60, 323/61
[51] Int. Cl. ........................................H02m 7/24, G05f 1/20
[58] Field of Search.....................323/6, 17, 22 SC, 22 T, 24, 323/34, 35, 36, 48, 57, 60, 61; 321/16, 18; 307/252 P, 297

[56] References Cited

UNITED STATES PATENTS

| | | | |
|---|---|---|---|
| 3,129,383 | 4/1964 | Karo | 323/48 |
| 3,205,425 | 9/1965 | Moyer | 321/18 |
| 3,223,922 | 12/1965 | Borden | 323/66 |
| 3,358,210 | 12/1967 | Grossoehme | 321/18 |

*Primary Examiner*—Gerald Goldberg
*Attorney*—Kenneth S. Goldfarb

[57] ABSTRACT

An automatic DC voltage regulating system includes an automatic AC voltage regulator whose output impedance is inductive. Voltages respectively in phase with the voltages of an input and an output winding of this AC voltage regulator are combined by means of a pair of additional windings magnetically connected with the input and output windings and themselves interconnected in series. A series circuit of a resistance and a capacitor, for example, is connected to the aforesaid additional windings so as to cause a desired phase lag to the above obtained resultant of the input and output voltages of the AC voltage regulator. The output voltage of this resistance-capacitor series circuit is applied via a transformer to a rectifier connected in tandem with the AC voltage regulator, thereby controlling the gate of at least one thyristor included in the rectifier in accordance with variation in the value of the load current. There are also disclosed herein several other examples of the automatic DC voltage regulating system of the invention.

9 Claims, 9 Drawing Figures

AUTOMATIC DC VOLTAGE REGULATING SYSTEM

This invention relates generally to voltage regulating systems, and in particular to improved automatic DC voltage regulating systems of a type where the output of an automatic AC voltage regulator is rectified for the provision of DC power.

There have been proposed a number of systems for the provision of unfluctuating DC power from AC sources. Broadly, these systems are based upon either one of the following three schemes: (1) Automatic control of the DC voltage, obtained by rectification of AC power, by means of transistors and other control elements provided between the rectifier and a load; (2) automatic control of an AC voltage regulator according to the detected and amplified fluctuations in the output voltage of a rectifier connected to the outputs of the AC voltage regulator; and (3) rectification of the output of an automatic AC voltage regulator.

The above scheme (1) permits easy and precise voltage regulation, making possible to produce DC voltage with a minimized degree of fluctuations, but has a drawback in that it necessitates highly involved circuit configurations. The operation of the systems based upon this scheme is not reliable enough under unfavorable atmospheric conditions such as high temperature and humidity. While the scheme (2) may be well suited for large-capacity DC power supply, a smoothing circuit employed for the removal of fluctuations in the DC output tends to cause the so-called "hunting" and may retard the response speed of the system. The scheme (3) has its inherent drawback, too, in that the DC voltage obtained is subject to fluctuations along with load fluctuations. This hitherto unremedied defect nearly offsets its greatest advantage, i.e. a simple and high-reliability voltage regulating system realized thereby.

Founded essentially upon this last scheme (3), the present invention has it as a primary object to provide a new and better automatic DC voltage regulating system of simple circuit configuration, whereby constant DC power is obtainable from AC sources under varying load conditions.

Another object of the invention is to provide an automatic DC voltage regulating system wherein the variations of a phase difference between the input and output voltages of an automatic AC voltage regulator in use are utilized for the supply of greatly stabilized DC voltage.

Still another object of the invention is to provide an automatic DC voltage regulating system wherein a rectifier is connected so as to be capable of automatically compensating for voltage drop that may be caused by the internal resistance of a DC output circuit and by a capacitor used in a smoothing circuit.

Yet another object of the invention is to provide an automatic DC voltage regulating system wherein a phase shift circuit is provided to cause some phase lag to the resultant of the input and output voltages of an automatic AC voltage regulator in use, a phase difference between these input and output voltages being subject to change in proportion to the value of the load current of the automatic AC voltage regulator, and the output voltage of the aforesaid phase shift circuit with its phase lag is applied as a gate signal to a rectifier (connected in tandem with the automatic AC voltage regulator) for voltage control in accordance with load fluctuations.

The novel features that are considered characteristic of the automatic DC voltage regulating systems of the invention are set forth with particularity in the appended claims. The invention itself, however, with its additional objects and advantages, will be best understood from the following detailed description when read in conjunction with the accompanying drawings showing some preferred embodiments thereof and the related prior art.

In the drawings:

FIG. 1 is a connection diagram of a prior automatic DC voltage regulating system;

FIGS. 2(a) and (b) are vector diagrams given by way of explanation of the operation of the prior automatic DC voltage regulating system of FIG. 1;

Figure 1:
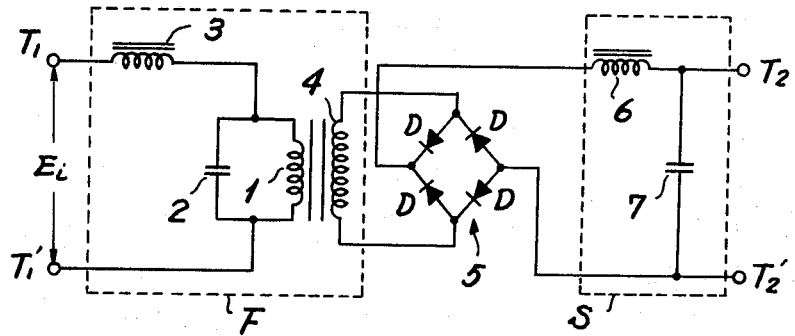

For further clarification of the problems left unsolved by the prior art, and for clearer appreciation of the advantages of the present invention, it is considered essential that a prior automatic DC voltage regulating system bearing some relation with the invention be shown and described in greater detail. FIG. 1 of the appended drawings schematically illustrates the circuit configuration of the prior automatic DC voltage regulating system, whereas FIGS. 2(a) and (b) are vectorial representations of the voltages indicated during the operation of this prior system. Referring now to FIG. 1 in particular, the reference character F generally designates an automatic AC voltage regulator, equipped with a ferroresonant circuit comprising a heavily saturated reactor 1 and a capacitor 2 connected in parallel therewith. This ferroresonant circuit is connected to AC power supply terminals $T_1$ and $T_1'$ via an unsaturated reactor 3. An output winding 4 is wound on the heavily saturated reactor 1, while being insulated therefrom, and its alternating output voltage is to be converted into DC voltage by means of a full-wave rectifier 5 with its four diodes D interconnected in the form of a bridge circuit. This DC voltage is to be obtained from DC output terminals $T_2$ and $T_2'$ upon removal of its fluctuations by means of a smoothing circuit S comprising a choke 6 and a capacitor 7.

Figure 2A:
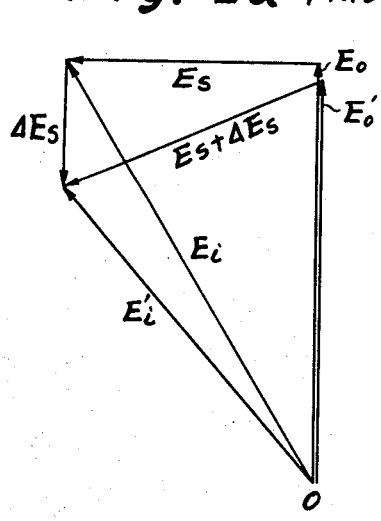

Proceeding to the description of the operation of this prior DC voltage regulating system, let $E_i$ be the AC voltage applied to the terminals $T_1$ and $T_1'$, and $E_o$ be the terminal voltage of the heavily saturated reactor 1. Further consider a state of ferroresonance in which the lagging current of the heavily saturated reactor 1 and the leading current of the capacitor 2 are balanced. Then the terminal voltage $E_s$ of the unsaturated reactor 3 will be determined by load current due to the output winding 4 and, if this load current is due to resistance, the voltage $E_s$ will be in rectangular phase relationship with the voltage $E_o$ as illustrated in FIG. 2(a). Since $E_s + E_o = E_i$, this input voltage $E_i$ may be vectorially represented by the line connecting the base 0 of the vector $E_o$ and the arrow-headed end of the vector $E_s$ as in FIG. 2(a).

Further with reference to FIG. 2(a), if the input voltage $E_i$ drops down to $E_i'$, the voltage $E_o$ of the reactor 1 will correspondingly drop to $E_o'$. Since this reactor 1 is heavily saturated as mentioned already, the value of its lagging current is reduced so much that the resultant of the currents of the reactor 1 and the capacitor 2 will be a great leading current. The addition $\Delta E_s$ to the terminal voltage $E_s$ of the unsaturated reactor 3 due to this leading current indicates rectangular phase relationship with the voltage $E_s$ as illustrated in the same drawing. Hence $E_o' + E_s + \Delta E_s$ is at equilibrium with the reduced input voltage $E_i'$. If the reactor 1 is heavily saturated as above, the voltage drop thereof is only negligible, with $E_o'$ approximating $E_o$.

Consider now the opposite case where the input voltage $E_i$ rises. The resultant of the currents of the reactor 1 and the capacitor 2 will then constitute a lagging current, with the result that the change $\Delta E_s$ in the terminal voltage $E_s$ of the unsaturated reactor 3 is oriented in the opposite direction. A state of equilibrium is similarly obtained in this case. It will accordingly be seen that fluctuations in the terminal voltage $E_o$ of the heavily saturated reactor 1 are negligible compared to those in the input voltage $E_i$, and that the terminal voltage of the output winding 4 is nearly constant. Substantially unfluctuating DC output voltage is thus obtainable via the fullwave rectifier 5 and the smoothing circuit S.

Figure 2B:
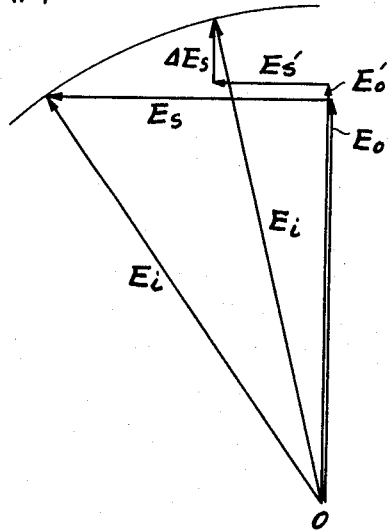

The operation of the prior automatic DC voltage regulating system of FIG. 1 in the event of load fluctuations is explained hereinbelow with reference to the vector diagram of FIG. 2(b). Reduction in the value of the load current, first of all, brings about a proportional drop of the voltage $E_s$ of the unsaturated reactor 3, to $E_s'$. The output voltage $E_o$ needed for equilibrium with the input voltage $E_i$ will then be slightly increased, to $E_o'$, with the result that the value of the lagging current of the heavily saturated reactor 1 shows a great increase. The unsaturated reactor 3 is thereby caused to produce an additional voltage $\Delta E_s$, and now $E_o' + E_s' + \Delta E_s = E_i$. In this manner, large load fluctuations are compensated for by slight changes in the voltage $E_o$ of the reactor 1.

While substantially constant AC output is accordingly obtainable in spite of such load fluctuations, this AC voltage when succeedingly converted into DC voltage is subject to fluctuations due to the influence of the internal resistances of the choke 6, the rectifier 5, etc., as well as the influence of difference in the current charged to and discharged from the capacitor 7. Accordingly to a conventionally proposed measure for the correction of this defect, a magnetic amplifier is series connected with the rectifier 5, the load current being flowed to the DC excitation winding of this magnetic amplifier. This countermeasure finds little practical application, however, because the magnetic amplifier has to be of comparatively large capacity and because its DC excitation winding is likely to introduce pulsations in the voltage.

Figure 3A:
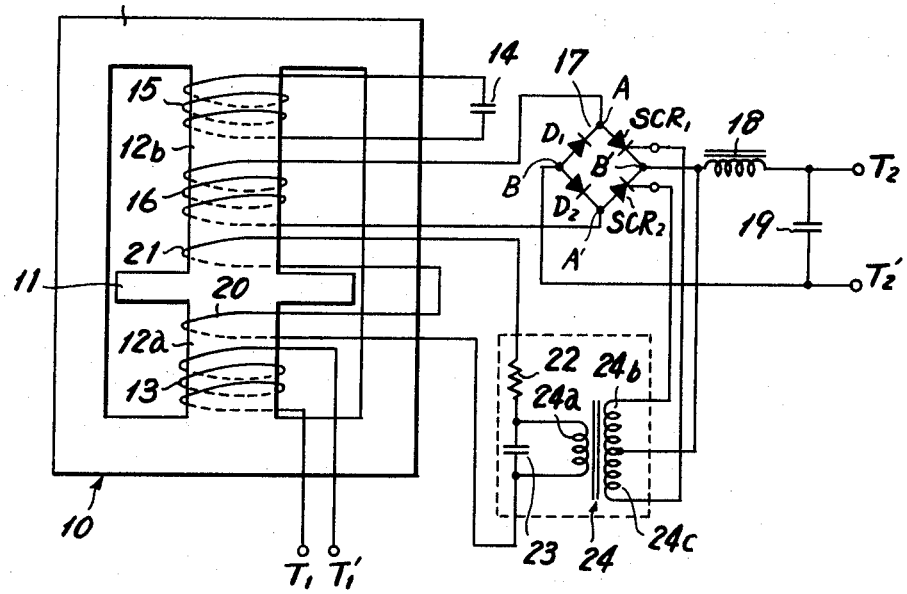
FIG. 3(a) is a connection diagram of an embodiment of the present invention making use of a constant voltage regulator, FIG. 3(b) being a connection diagram showing a modified example of the circuit portion of FIG. 3(a) surrounded by the dotted lines.
Figure 3B:
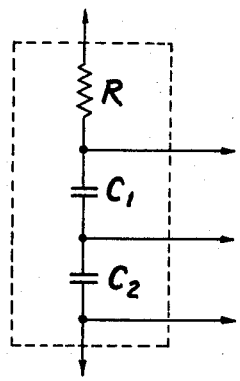

Several preferred embodiments of the present invention will now be described in detail with reference to FIGS. 3 through 7. Referring first to FIG. 3(a), which schematically illustrates an exemplary configuration of an automatic DC voltage regulating system in accordance with the present invention, the reference numeral 10 generally designates an automatic ferroresonant voltage regulator with a single iron core, or the so-called constant voltage transformer (hereinafter referred to by this latter term). The iron core provided to this constant voltage transformer 10 includes a portion 11 for a path of leakage flux. On a primary side portion 12a of the iron core with respect to this portion 11 there is wound a primary (or an input winding) 13 which is connected to AC input terminals $T_1$ and $T_1'$. On a secondary side portion 12b of the same iron core, on the other hand, there is wound a ferroresonance winding 15 which is parallel connected with a capacitor 14. Further on this secondary side iron core portion 12b there is wound an output winding 16 which is magnetically connected with the aforesaid ferroresonance winding 15. The both ends of this output winding 16 are connected to a pair of the junctions of a full-wave rectifier 17 in which are connected two diodes $D_1$ and $D_2$ and two thyristors $SCR_1$ and $SCR_2$ in the form of a bridge circuit. The other pair of the junctions of this full-wave rectifier 17 are connected to a smoothing circuit comprising a choke 18 and a capacitor 19, thereby to remove fluctuations in the DC output voltage of the full-wave rectifier 17 and to produce the desired constant DC voltage from output terminals $T_2$ and $T_2'$. Additional windings 20 and 21 coiled on the aforesaid primary and secondary side portions 12a and 12b, respectively, of the iron core are interconnected in series so that their voltages may be added together. In the series circuit of these windings 20 and 21 there is interposed another series circuit of a resistance 22 and a capacitor 23 (constituting a thyristor gate control circuit) thereby to cause a desired phase lag to the resultant of the voltages of the windings 20 and 21. Further connected between the terminals of this capacitor 23 is a primary 24a of a transformer 24 for application of gate control signals to the aforesaid thyristors $SCR_1$ and $SCR_2$ through its secondaries 24b and 24c which are connected between the gate and the cathode of the thyristors $SCR_1$ and $SCR_2$, respectively.

In the automatic DC voltage regulating system of the foregoing configuration in accordance with the present invention, the functions of the constant voltage transformer 10 are substantially as described already with respect to the automatic AC voltage regulator of FIG. 1. The iron core portion including the ferroresonance winding 15 is heavily saturated, and this winding 15 in combination with the capacitor 14 causes the ferroresonant phenomenon. The portion 11 as a path of leakage flux functions the same as the unsaturated reactor of FIG. 1.

Figure 4:
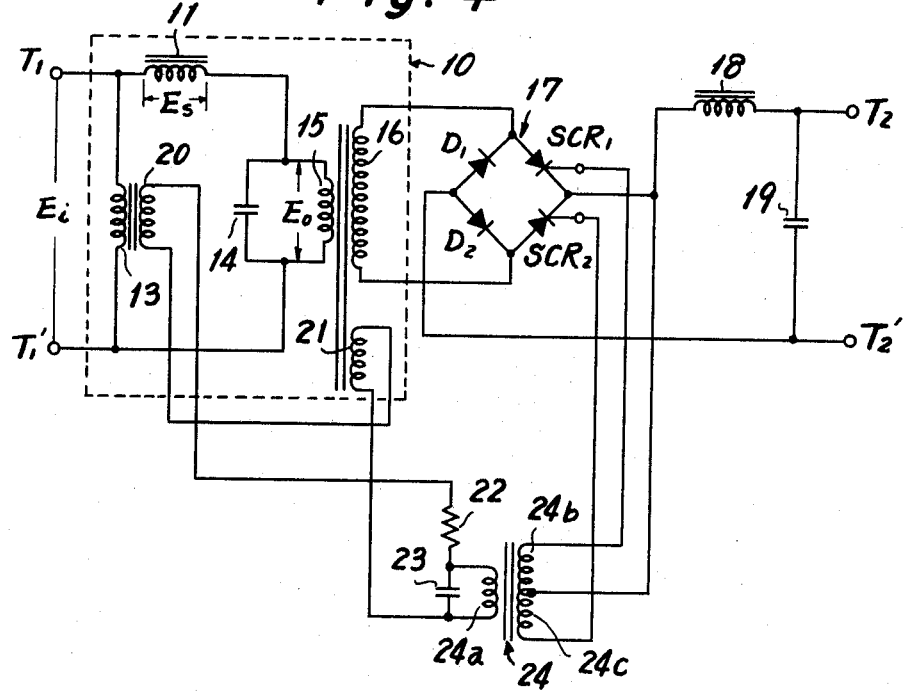
FIG. 4 is an equivalent circuit diagram of the automatic DC voltage regulating system of FIG. 3(a)

FIG. 4 is an equivalent representation of the overall circuit of FIG. 3(a). Referring to this equivalently converted circuit of FIG. 4, if the thyristors $SCR_1$ and $SCR_2$ of the fullwave rectifier 17 are kept excited with the aforesaid gate control signals from the transformer 24, this rectifier will function the same as an ordinary rectifier. Consequently this circuit operates in a manner corresponding to the operation of the above described circuit of FIG. 1, producing constant DC voltage regardless of fluctuations in AC voltage supplied.

Figure 5:
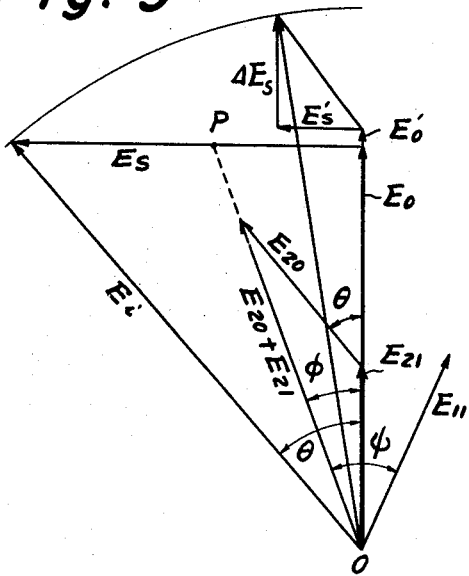
FIG. 5 is a vector diagram given by way of explanation of the operation of the automatic DC voltage regulating system of FIGS. 3 and 4.

The operation of the first embodiment of the present invention illustrated in FIGS. 3 and 4 in event of fluctuations in the value of the load current will now be described with reference to the vector diagram of FIG. 5, where $E_i$, $E_o$, $E_o'$, $E_s$, $E_s'$ and $E_s$ respectively correspond to the like reference characters of FIG. 2 and where $E_{20}$ and $E_{21}$ represent the voltages of the aforementioned additional windings 20 and 21, respectively, wound on the iron core of the constant voltage transformer 10. These voltages $E_{20}$ and $E_{21}$ are in phase with the input voltage $E_i$ and the AC output voltage $E_o$, respectively, so that the resultant voltage thereof obtained when the windings 20 and 21 are series interconnected as in FIG. 3 is represented by the vector $E_{20} + E_{21}$ in FIG. 5. The angle between this vector and the vector $E_o$ is designated by $\Phi$. The terminal voltage $E_{23}$ of the capacitor 23 has a phase lag equal to $\psi$, determined by the capacitor 23 itself and the resistance 22, with respect to the aforesaid resultant voltage $E_{20} + E_{21}$. Hence the phase angle between $E_o$ and $E_{23}$ is: $\psi - \Phi$. This angle is to decrease along with increase in the angle $\theta$ between the input voltage vector $E_i$ and the AC output voltage vector $E_o$ due to increase in the value of the load current, and vice versa.

The values of the resistance 22 and the capacitor 23 are so determined that the vector $E_{23}$ at full load may approximate the vector $E_o$ in phase. Accordingly, when the value of the load current increases, the voltage impressed to the respective gates of the thyristors $SCR_1$ and $SCR_2$ approximates the voltage $E_o$ in phase, thus resulting in increased DC output voltage, whereas, when the value of the load current decreases, the excitation periods of the thyristors $SCR_1$ and $SCR_2$ are retarded, which results in decreased DC output voltage. It is also proposed herewith that, by adequate selection of the ratio between $E_o$ and $E_{21}$, a tendency of DC output fluctuations due to load fluctuations and a tendency of voltage fluctuations due to the rectifier, the smoothing circuit, etc. in use are directed opposite to each other and hence are counterbalanced. The fluctuations in the DC output voltage due to load fluctuations are thus remarkably reduced. A superior DC power supply is hereby materialized whose output does not fluctuate to any appreciable degree regardless of variations not only of the input voltage but of the load current, too.

As may also be contemplated with relation to this first embodiment of the present invention, the value of $E_{21}$ may be made large compared to that of $E_{20}$ to reduce variations of $\Phi$ when the internal resistance of the full-wave rectifier and the smoothing circuit in use are small. When these internal resistances are large, on the other hand, the value of $E_{21}$ may be reduced or it may be opposite phased as desired, thereby to increase the variations of $\Phi$. Further, while the transformer 24 is used in order to obtain opposite-phased voltages for the excitation of the two thyristors $SCR_1$ and $SCR_2$ in this particular embodiment, will be understood that the portion of the circuit of FIG. 3(a) surrounded by the dotted lines may be rearranged as in FIG. 3(b), wherein capacitors $C_1$ and $C_2$ are series connected with a resistance R. Furthermore the constant voltage transformer 10 mentioned as an automatic AC voltage regulator in the same embodiment is not of a limitative nature; indeed, it may be replaced by any other automatic AC voltage regulator only if its output impedance is inductive, such that the phase of its output voltage increases in the lagging direction with respect to the input voltage when the load current increases. It is also found out in our experiments that, while the windings 20 and 21 are wound on the primary and secondary side portions 12a and 12b of the iron core of the constant voltage transformer 10 and are series interconnected in order to provide the resultant $E_{20} + E_{21}$ of their voltages, substantially the same effect is obtainable with the use of the voltage represented by the vector connecting the base 0 of the vector diagram of FIG. 5 and a point P on the vector $E_s$.

Figure 6:
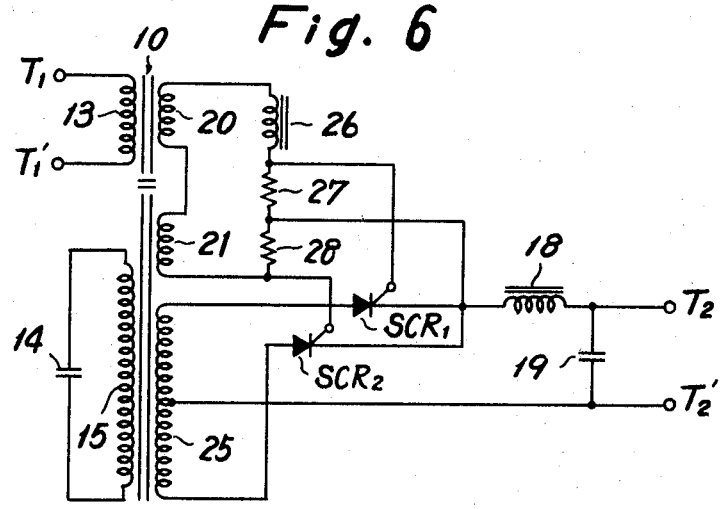
FIG. 6 is a connection diagram of another embodiment of the present invention.

The circuit configuration of another embodiment of the present invention is schematically illustrated in FIG. 6, where circuit elements used likewise in FIG. 3(a) or 4 are indicated by like reference characters. Among the components newly introduced in this second embodiment of the invention, a center-tapped output winding 25 is for single-phase full-wave rectification, thyristors $SCR_1$ and $SCR_2$ being connected to the terminals of this output winding 25. These thyristors $SCR_1$ and $SCR_2$ are also connected to windings 20 and 21, respectively, which are adapted to obtain voltages in phase with the voltages of a primary 13 and a secondary 15. As a phase shift circuit (or a fixed phase lag circuit, to be more specific) connected in series with these windings 20 and 21, there is provided a series circuit of an inductance 26, a resistance 27 and another resistance 28. The terminal voltage of these resistances 27 and 28 is to be impressed to the respective gates of the aforesaid thyristors $SCR_1$ and $SCR_2$.

In the above described circuit configuration of the second embodiment of the invention, the phase of the voltage obtained from the terminals of the resistances 27 and 28 comes near to the phase of the AC output voltage of the constant voltage transformer 10 when the load current is comparatively large, and lags the phase of the AC output voltage when the load current is comparatively small, thus controlling the excitation periods of the thyristors $SCR_1$ and $SCR_2$ and accordingly modifying the fluctuations in the DC output voltage obtained. The aforesaid inductance 26 of this circuit may be replaced by a saturable reactor, thereby to render variable the value of the fixed phase lag by adjustment of its direct exciting current. This alternative has the advantage of permitting the fine adjustment of the DC output voltage, either automatically or manually.

Figure 7:
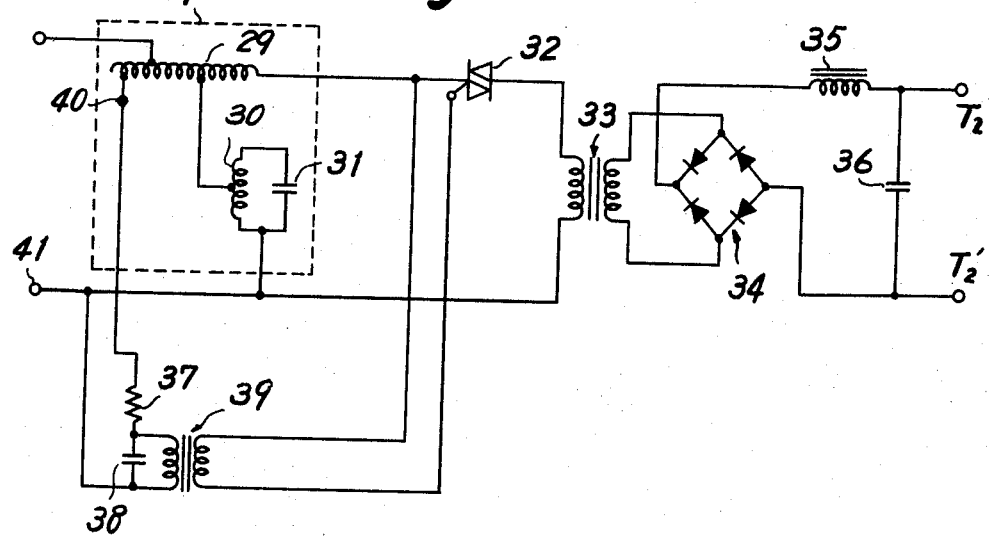
FIG. 7 is a connection diagram of still another embodiment of the present invention.

FIG. 7 schematically illustrates the circuit configuration of still another embodiment of the present invention, wherein an automatic AC voltage regulator F' is of popular ferroresonance type, comprising an inductance 29, a saturated reactor 30 and a capacitor 31. Further with reference to FIG. 7, the reference numeral 32 indicates a thyristor for alternating current, 33 a transformer for the supply of AC voltage to a rectifier 34, and 35 a choke which in combination with a capacitor 36 constitutes a smoothing circuit. A resistance 37 and a capacitor 38 are designed to cause the above explained fixed phase lag, while an insulating transformer 39 is provided for applying the lagging voltage obtained to the gate of the aforesaid thyristor 32. The voltage obtained from between a tap 40 provided to the inductance 29 and an input terminal 41 is in such phase relationship with the AC output voltage of the automatic AC voltage regulator F' as explained already, so that the DC output voltage obtained similarly increases along with increase in the value of the load current. The above voltage is supplied to the gate of the thyristor 32 via a phase shift circuit (consisting of the resistance 37 and the capacitor 38) and the insulating transformer 39. Also as explained already, the excitation periods of the thyristor 32 are then caused to quicken upon increase in the value of the load current, so that the AC voltage applied to the transformer 33 increases. When the value of the load current decreases, the excitation periods of the thyristor 32 tend to retard. It is accordingly possible to compensate for the fluctuations that may otherwise be present in the DC output voltage of this automatic DC voltage regulating system.

Although some preferred embodiments of the present invention have been shown and described in the foregoing, the invention itself is not considered to be restricted thereby but include a latitude of modification, substitution and change. It is accordingly appropriate that the appended claims be construed broadly and in a manner consistent with the spirit and scope of the invention disclosed herein.

What is claimed is:

1. An automatic DC voltage regulating system comprising, in combination:
   an automatic AC voltage regulating means whose output impedance is inductive;
   a rectifying means connected in tandem with said automatic AC voltage regulating means and comprising a plurality of rectifying elements at least one of which is a thyristor;
   a voltage combining means for obtaining the resultant of the input voltage and output voltage of said automatic AC voltage regulating means, a phase lag of said output voltage with respect to said input voltage being subject to change along with variation in the value of the load current of said automatic AC voltage regulating means; and
   a phase shifting means connected between said voltage combining means and said rectifying means, said phase shifting means causing such a phase lag to the output voltage of said voltage combining means that said output voltage of said voltage combining means becomes substantially in phase with said output voltage of said automatic AC voltage regulating means only at full load;
   whereby the excitation periods of said at least one thyristor included in said rectifying means are controlled according to the phase of the output voltage of said phase shifting means.

2. An automatic DC voltage regulating system as claimed in claim 1, in which said rectifying means comprises a plurality of diodes, and a thyristor for alternating current is provided between said automatic AC voltage regulating means and said rectifying means, the excitation periods of said thyristor for alternating current being controlled according to the phase of the output voltage of said phase shifting means.

3. An automatic DC voltage regulating system as claimed in claim 2, further comprising a transformer which is connected between said thyristor for alternating current and said rectifying means.

4. An automatic DC voltage regulating system as claimed in claim 1, in which said phase shifting means is formed by a series circuit of a resistance and a capacitor.

5. An automatic DC voltage regulating system as claimed in claim 1, in which a smoothing circuit is connected on the output side of said rectifying means, said smoothing circuit including a choke.

6. An automatic DC voltage regulating system as claimed in claim 1, in which said phase shifting means is formed by a series circuit of a resistance and two capacitors.

7. An automatic DC voltage regulating system as claimed in claim 1, in which said phase shifting means is formed by a series circuit of an inductance and two resistances.

8. An automatic DC voltage regulating system as claimed in claim 1, in which said phase shifting means comprises a resistive element and a capacitor, and an insulating transformer is connected between said phase shifting means and the gate of said at least one thyristor included in said rectifying means.

9. An automatic DC voltage regulating system as claimed in claim 1, in which said voltage combining means comprises a pair of windings coiled on an iron core of said automatic AC voltage regulating means so as to be respectively magnetically connected with an input winding and output winding thereof, said pair of windings being interconnected in series so as to provide the resultant of voltages respectively in phase with the voltages of said input winding and said output winding.

* * * * *